United States Patent [19]

Maine et al.

[11] Patent Number: 5,506,886
[45] Date of Patent: Apr. 9, 1996

[54] WIDE AREA PAGING WITH ROAMING SUBSCRIBER UNITS

[75] Inventors: Kristine P. Maine, Phoenix; Ann K. Miller, Mesa; Phillip E. Hall, Scottsdale, all of Ariz.

[73] Assignee: Motorola, Inc., Schaumburg, Ill.

[21] Appl. No.: 503,257

[22] Filed: Jul. 17, 1995

Related U.S. Application Data

[63] Continuation of Ser. No. 172,966, Dec. 27, 1993, abandoned.

[51] Int. Cl.$^6$ .................................................. H04M 11/00
[52] U.S. Cl. ........................... 379/57; 379/59; 379/60; 455/12.1; 455/33.1
[58] Field of Search ................................. 379/56, 57, 58, 379/59, 60, 63; 455/33.1, 33.2, 12.1; 340/311.1, 825.44

[56] References Cited

U.S. PATENT DOCUMENTS

| | | | |
|---|---|---|---|
| 4,178,476 | 12/1979 | Frost . | |
| 4,700,374 | 10/1987 | Bini | 379/60 |
| 4,833,477 | 5/1989 | Tendler | 342/389 |
| 4,870,419 | 9/1989 | Baldwin | 342/50 |
| 5,029,196 | 7/1991 | Morganstein | 379/67 |
| 5,043,736 | 8/1991 | Darnell | 342/357 |
| 5,090,050 | 2/1992 | Heffernan | 379/60 |
| 5,099,507 | 3/1992 | Mukai et al. | 379/57 |

FOREIGN PATENT DOCUMENTS 0295678  12/1988  European Pat. Off. .

Primary Examiner—Curtis Kuntz
Assistant Examiner—G. J. Oehling
Attorney, Agent, or Firm—Walter W. Nielsen; Gregory J. Gorrie

[57] ABSTRACT

A paging system (10) includes any number of spaced apart transmitters (12), each of which has its own area (15) of coverage. A population of subscriber units (24) freely roams between the areas (15). When a subscriber unit (24) roams to a new area (15), a call is placed from a telephone instrument (22) to a destination controller (28) through the public switched telecommunication network (21). A subscriber ID and location data are transferred to the system (10) during this call. The location data are used internally by the system (10) to route pages to only the transmitters (12) whose areas (15) correspond to the location data, and only these transmitters (12) broadcast the pages. Subscriber units (24) may generate the location data which the system (10) uses in routing pages to transmitters (12). A position-determining receiver (42) may directly obtain location data from a positioning system (34). Alternatively, location data may be obtained from transmissions broadcast by the transmitters (12).

7 Claims, 8 Drawing Sheets

WIDE AREA PAGING WITH ROAMING SUBSCRIBER UNITS

This application is a continuation of prior application Ser. No. 08/172,966, filed Dec. 27, 1993 now abandoned.

TECHNICAL FIELD OF THE INVENTION

The present invention relates generally to simplex paging systems. More specifically, the present invention relates to paging systems in which subscriber units roam between areas of coverage.

BACKGROUND OF THE INVENTION

Simplex data communication systems, also known as one-way or passive systems, are employed in connection with paging. Generally speaking, one or more transmitters broadcast data communications. The communications include data which identify specific pagers. A population of pagers receives the broadcast communications. When one of the population of pagers identifies a communication directed to it, it alerts a subscriber to the incoming communication and often displays a numeric or alphanumeric message carried by the communication. However, due to the simplex nature of the communications, the system does not know when a pager fails to receive a page directed to it.

Conventional paging systems experience a problem related to a limited range. A paging system works only when its pagers reside within the area covered by the system's transmitters. When subscribers travel outside this area, their pagers cannot receive calls. This problem is exacerbated by the simplex nature of the communications which prevents the system or the sender of the page from knowing whether the page was actually received by the target pager.

A related problem is that of limited information transmission capacity for delivering pages. As any single area of coverage increases to better serve subscriber needs, the population of pagers covered by the area likewise increases. As the population of pagers increases, the number of data communications increases. Thus, as a coverage area increases, a point of diminishing returns is reached. The number of data communications is so great that an unacceptable delay in the delivery of pages is experienced.

The limited range and limited capacity problems are addressed, at least in part, by the use of a paging system with multiple transmitters distributed throughout a wide area of coverage. The multiple transmitters distributed throughout a wide area extend the coverage achievable by a single transmitter.

When the system has a priori knowledge of a pager's location, overall system utilization can increase as well. The system may use information describing the pager's location to route a page to only the transmitter that covers the position indicated by the location information. Only this transmitter broadcasts the page. The information transmission capacity of the other transmitters in the system is not consumed in broadcasting the page. Thus, overall system capacity utilization is improved.

However, a need exists for improved techniques in acquiring a priori knowledge of a pager's location. In one system, when a user roams between diverse areas of coverage the user has a duty to place a local phone call to a local page destination controller whenever the user arrives in a new area. During this phone call, the user identifies himself or herself as being in the area served by the local destination controller to which the phone call is made. Later, this destination controller contacts another controller which is associated with the origination of pages to the user and informs this origination controller of the identities of the subject pager and of the destination controller. Pages may thereafter be routed from the origination controller through land lines to the destination controller and broadcast from a transmitter associated with the destination controller.

Unfortunately, the local phone number of the destination controller to which the call must be placed is not a number that the user would readily know. Moreover, when the user roams between numerous local areas, the user is required to have phone numbers for all these numerous local areas. Furthermore, the user may not know when he or she has traveled out of a particular area of coverage. Accordingly, such a system is far too complicated for users to successfully operate when more than a few diverse areas of coverage are encompassed by the system.

SUMMARY OF THE INVENTION

Accordingly, it is an advantage of the present invention that an improved wide-area paging system is provided.

Another advantage of the present invention is that a wide-area paging system is provided which efficiently uses the RF spectrum and which has a large information transmission capacity for delivering pages.

Another advantage of the present invention is that a wide-area paging system is provided in which a roaming user places a phone call to only a single phone number regardless of the coverage area into which the user has traveled.

Yet another advantage is that the present invention provides a wide-area paging system in which the user provides location information to the paging system.

Another advantage of the present invention is that a subscriber unit is provided which generates information describing a location for the subscriber unit.

The above and other advantages of the present invention are carried out in one form by an improved wide-area paging method which is practiced in connection with a paging system wherein subscriber units respond to coded radio transmissions by providing perceptible indications of page receipts. The radio transmissions are broadcast from a plurality of transmitters, each of which serves a prescribed geographic area. The subscriber units roam between the areas. The method calls for the placing of a telephone call from a subscriber unit's current location to a destination controller. Data describing the location is transferred to the destination controller during this call. One of the transmitters which serves an area that includes this location is identified from the location data. A data message intended for the subscriber unit is sent to the identified transmitter. The identified transmitter broadcasts the data message.

The above and other advantages of the present invention are carried out in another form by an improved roaming subscriber unit for use in connection with a paging system wherein a plurality of similar subscriber units are responsive to coded radio transmissions. The radio transmissions are broadcast from a plurality of transmitters, each of which serves a prescribed geographic area. The subscriber units roam between these areas. The subscriber unit includes a position-determining receiver configured to provide first information. This first information describes a location. A page receiver is configured to provide second information. This second information is derived from the coded radio transmissions. A controller couples to the page receiver and to the position-determining receiver. A device for providing perceptible indications of the first and second information couples to the controller.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
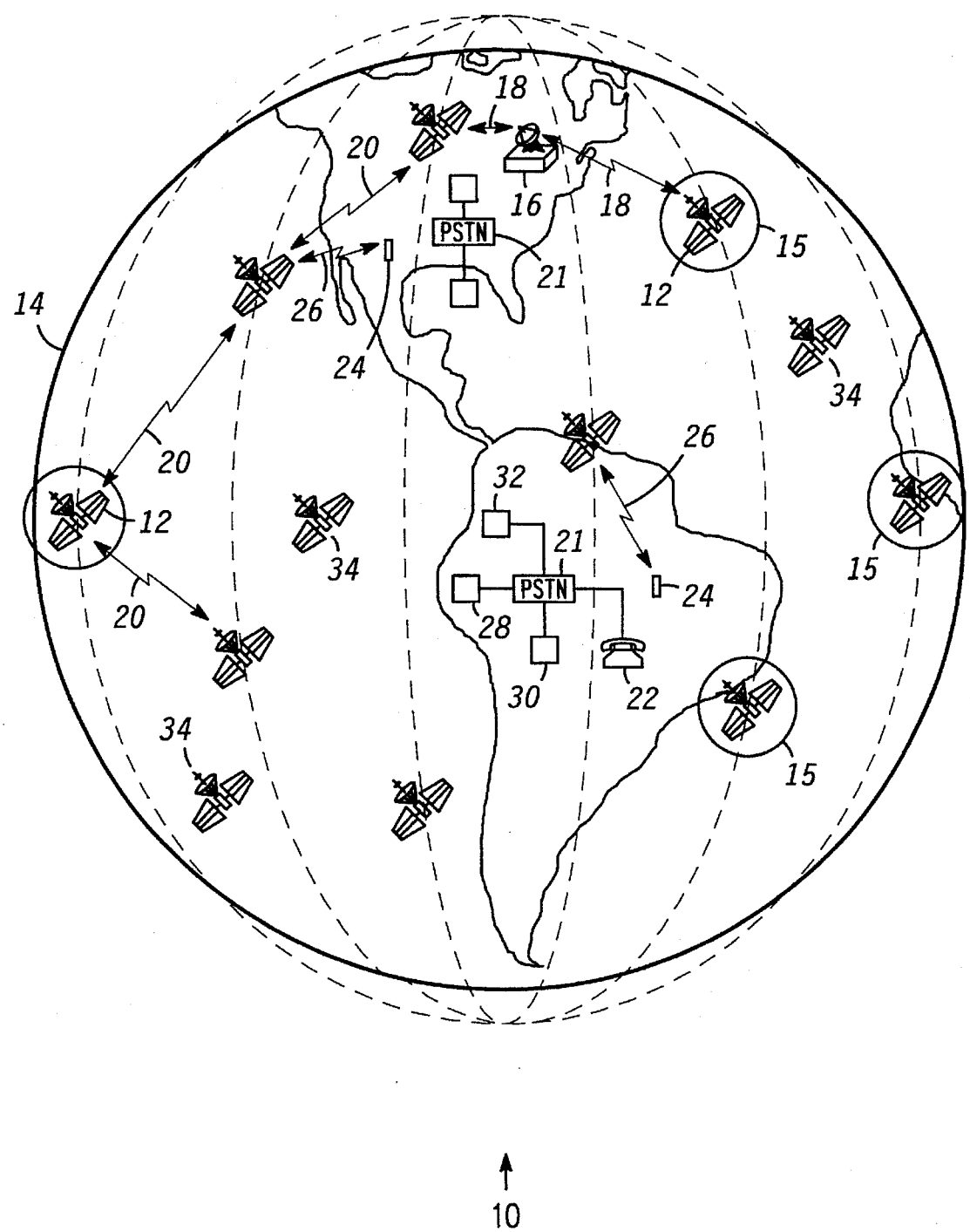
FIG. 1 shows a pictoral diagram depicting an environment within which a paging system configured in accordance with a preferred embodiment of the present invention is practiced.
Figure 2:
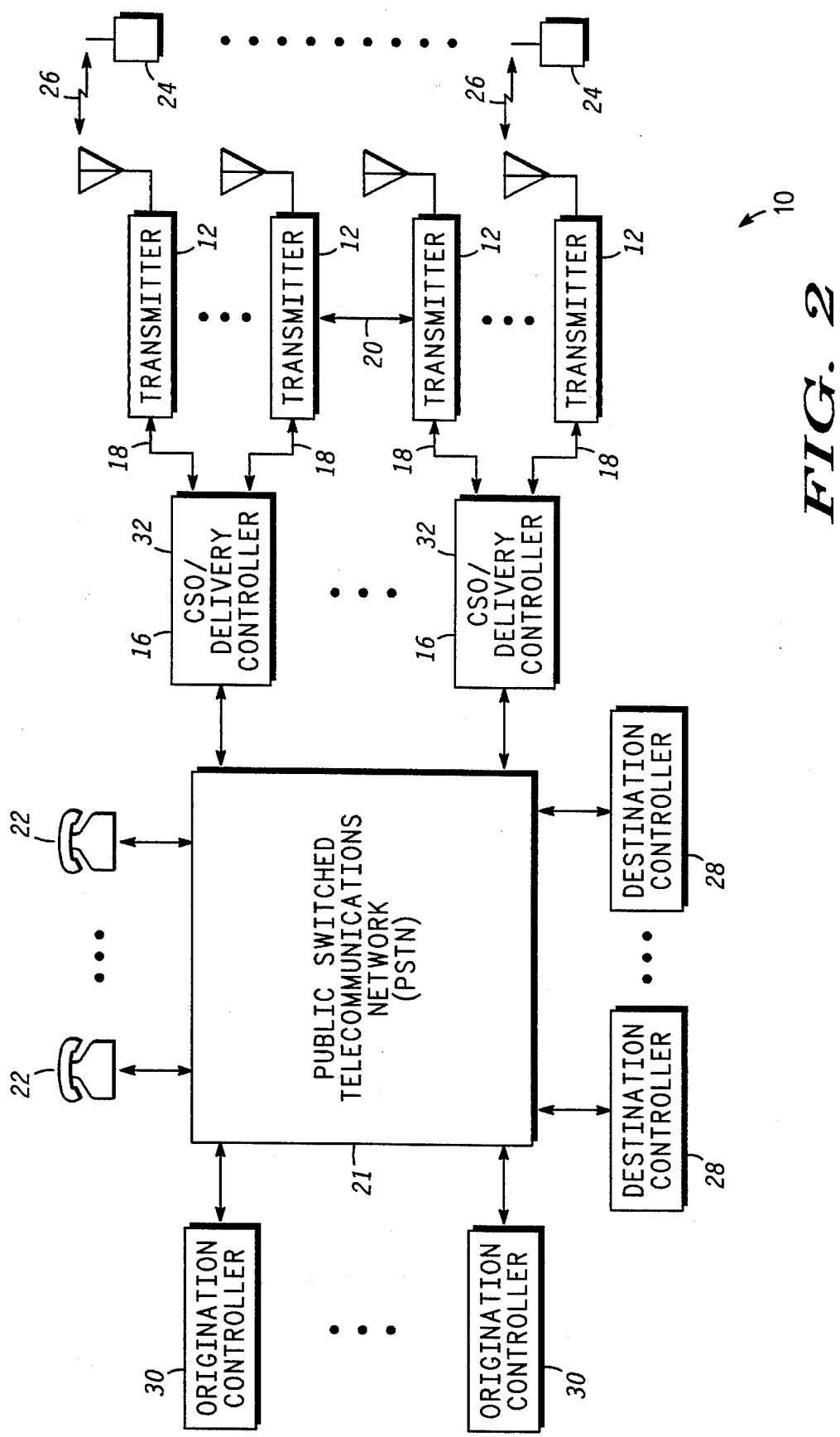
FIG. 2 shows a block diagram of the paging system.

FIG. 1 shows a pictoral diagram of a paging system 10 configured in accordance with a preferred embodiment of the present invention. FIG. 2 shows a block diagram of paging system 10. With reference to FIGS. 1 and 2, several satellites, hereinafter referred to as transmitters 12, are placed in relatively low orbits around the earth 14. Due to the low orbits, an overhead transmitter 12 moves with respect to a point on the surface of the earth. This allows any single transmitter 12 to be within view of a point on the surface of the earth for a limited duration.

Due to the low orbits of transmitters 12, line-of-sight electromagnetic transmissions from transmitters 12 cover a relatively small prescribed area 15 of the earth at any point in time. For example, when transmitters 12 occupy orbits at approximately 765 km above the earth, such areas are approximately 4075 km in diameter. Moreover, transmitters 12 may incorporate directional antennas which further divide this area into even smaller cells (not shown) having their own prescribed areas. Although FIG. 1 illustrates only a few transmitters 12 and a few areas 15 for clarity, transmitters 12 are preferably placed in orbits so that the entire constellation of transmitters 12 provides continual RF coverage over the entire earth.

System 10 additionally includes any number of central switching offices (CSOs) 16. CSOs 16 reside on the surface of the earth and are in data communication with nearby ones of transmitters 12 through RF communication links 18. Transmitters 12 are also in data communication with one another through data communication links 20. CSOs 16 couple to the public switched telecommunication network (PSTN) 21. Those skilled in the art will appreciate that PSTN 21 is present throughout the world and that millions of telephone instruments 22 couple to PSTN 21. Hence, communications may be delivered between substantially any two points on or near the surface of the earth through the constellation of transmitters 12 and through PSTN 21.

System 10 also includes any number, potentially in the millions, of subscriber units 24. Subscriber units 24 are configured to receive communications from the transmitters 12 within whose areas 15 the subscriber units 24 currently reside and to perform other functions which are discussed below. Subscriber units 24 are intended to be used, at least in part, like conventional pagers. Thus, subscriber units 24 may be readily moved from place to place on or near the surface of the earth.

While the preferred embodiment of the present invention contemplates the use of transmitters 12 placed in orbit around the earth, those skilled in the art should appreciate that paging system 10 is not limited to having transmitters 12 placed in orbit, to having transmitters 12 that move with respect to the earth, or to having areas of coverage 15 from transmitters 12 that together cover the entire earth. Rather, those skilled in the art will understand that each transmitter 12 has its own area of coverage 15, at least at a given point in time, and that any given subscriber unit 24 may freely roam between these areas of coverage 15.

Communications from transmitters 12 are received at subscriber units 24 over communication links 26. In the preferred embodiment of the present invention, links 26 utilize RF frequencies which accommodate substantially line-of-sight communication, and links 26 are simplex links. In other words, communications travel only in one direction, from transmitters 12 to subscriber units 24. Simplex communication allows subscriber units 24 to be manufactured as small, inexpensive units and to consume a minimal amount of power. No simplex communication limitation is implied with respect to links 18 or 20. Moreover, nothing prevents devices other than subscriber units 24 from engaging in duplex communications through transmitters 12 from virtually any point on or near the surface of the earth.

System 10 additionally includes any number of destination controllers 28, origination controllers 30, and delivery controllers 32. Controllers 28, 30, and 32 represent data processing devices which couple to PSTN 21. In the preferred embodiment, each of controllers 28, 30, and 32 is implemented using well known computer components found in conventional personal and other computers. Thus, each of controllers 28, 30, and 32 includes processors, memory, magnetic and/or optical memory disk drives, display devices, keyboards and/or pointing devices, modems, and the like (not shown). Those skilled in the art will appreciate that the functions performed by controllers 28, 30, and 32 are defined in large part by programming instructions stored in the controllers' memories. These functions are discussed below. In addition, at least destination controller 28 and possibly origination controller 30 include dual tone multi-frequency (DTMF) decoders interfaced to phone lines to enable the implementation of a conventional telephonic interactive voice response (IVR) system. Such hardware implementations for data processing devices are well known and are not discussed further herein.

Generally speaking, controllers 28, 30, and 32 collect and manage data, including page messages, for paging system 10. Controllers 28, 30, and 32 may be located anywhere in the world. The differences between controllers 28, 30, and 32 are largely functional. Thus, although FIGS. 1 and 2 illustrate controllers 28, 30, and 32 as being separate devices for convenience, those skilled in the art may adapt a single computer to perform the functions of each of controllers 28, 30, and 32. Moreover, nothing prevents these functions from being associated with or incorporated into CSOs 16, as shown in FIG. 2 with respect to delivery controller 32.

In one embodiment of the present invention, discussed below, subscriber units 24 use a positioning system 34 (see FIG. 1), such as the Global Positioning System (GPS), in determining their locations. System 34 may include a constellation of artificial satellites which orbit the earth. Such system 34 satellites need not form a part of the switched communications network which includes PSTN 21, CSOs 16, and the constellation of transmitters 12. In this embodiment, subscriber units 24 use conventional techniques to monitor and process signals transmitted by system 34 to determine their own locations. Although the operation of system 34 is described herein for a GPS position locating system, this explanation is not intended to limit the present invention. Those skilled in the art will understand that other position location systems may also be used. Such other systems may broadcast signals from space or from near the earth.

Figure 3:
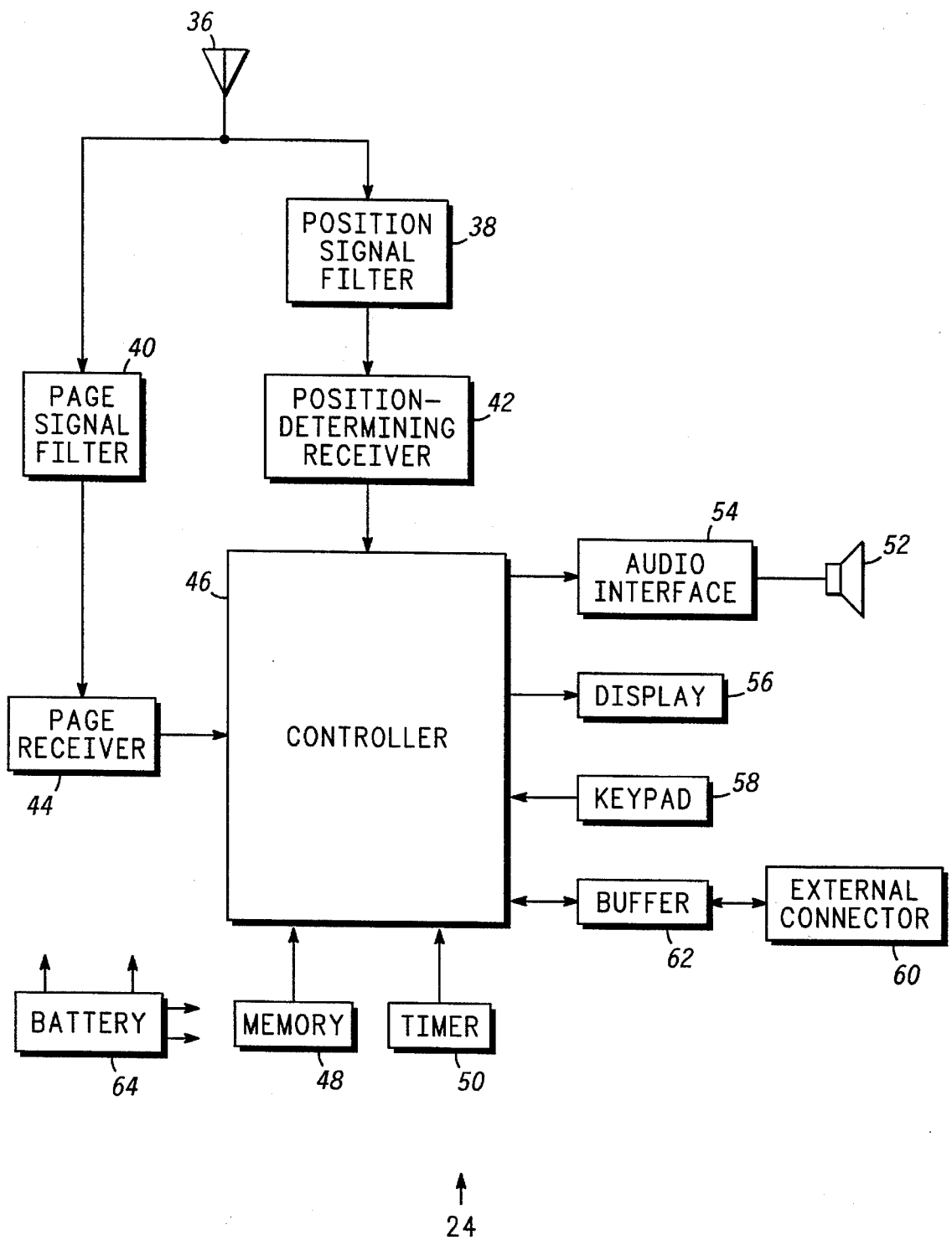
FIG. 3 shows a block diagram of a subscriber unit which operates in accordance with the paging system.

FIG. 3 shows a block diagram of a subscriber unit 24. Any number of subscriber units 24 within system 10 have a structure similar to that shown in FIG. 3. As shown in FIG. 3, subscriber unit 24 includes an antenna 36. Antenna 36 is compatible with signals broadcast by both of transmitters 12 of page system 10 and signals broadcast by the satellites from positioning system 34 (see FIG. 1). Antenna 36 couples to an input of a position signal filter 38 and to an input of a page signal filter 40. Position signal filter 38 is configured to pass only signals broadcast by positioning system 34 (see FIG. 1) while page signal filter 40 passes only signals broadcast by transmitters 12 (see FIG. 1). An output of position signal filter 38 couples to an input of a position-determining receiver 42, and an output of page signal filter 40 couples to an input of a page receiver 44.

Position-determining receiver 42 provides location information. Position-determining receivers 42 which are compatible with GPS signals, for example, provide such location information and are well known to those skilled in the art. In addition, other types of position-determining receivers may be used by subscriber unit 24.

A broad definition for location/position data/information is contemplated in connection with the present invention. For example, such information need only represent data which correlate with various diverse locations or areas of the earth. It need not be related to any particular well known coordinate system. Numerous examples of location data are known to those skilled in the art. For example, latitude and longitude data provided by a GPS receiver define location. In the preferred embodiment of the present invention where transmitters 12 (see FIG. 1) travel with respect to the earth, an identification (ID) broadcast by a transmitter 12, when coupled with data describing the time that the ID is received, represents location data because such data correlate to the locations on or near the surface of the earth that can receive the broadcast. Likewise, international phone numbers represent location data because the international code, area code, and extension portion of phone numbers correlate to particular areas of the earth. These and other types of location data may be used by paging system 10 to obtain a priori knowledge of subscriber unit 24 locations. Since location data may be obtained from many different sources, such as transmitters 12 or system 34, for example, position signal filter 38 and position-determining receiver 42 are optional features of subscriber unit 24.

Page receiver 44 provides page information. In particular, page receiver 44 receives signals broadcast from transmitters 12 (see FIG. 1). Page receiver 44 includes oscillators, down converters, analog-to-digital converters, and the like (not shown), configured for compatibility with signals broadcast from transmitters 12.

An output of position-determining receiver 42 and an output of page receiver 44 couple to a controller 46. Controller 46 may be provided by one or more conventional microprocessor circuits. Controller 46 additionally couples to a memory 48 and a timer 50. Memory 48 includes data which serve as instructions to controller 46 and which, when executed by controller 46 cause subscriber unit 24 to carry out procedures which are discussed below. In addition, memory 48 includes variables, tables, and databases that are manipulated due to the operation of subscriber unit 24. One variable stored in memory 48 is a unique ID for subscriber unit 24. Other variables are discussed below. Controller 46 uses timer 50 to maintain the current date and time and to accurately perform other timing functions.

Controller 46 of subscriber unit 24 also couples to a loudspeaker 52 through an audio interface 54. Audio interface 54 may include one or more of a digital-to-analog circuit, a DTMF tone generator, an amplifier, and the like (not shown) so that a variety of beeps, tones, and other sounds can be produced at loudspeaker 52 as audio information, which may then be perceived by a user of subscriber unit 24. Controller 46 additionally couples to a display 56, which provides visual information that can be perceived by a user of subscriber unit 24. A keypad 58 includes a plurality of switches (not shown) so that external signals from a user of subscriber unit 24 may be communicated to subscriber unit 24. Furthermore, controller 46 may couple to an external connector 60 through an appropriate buffer 62 so that external inputs may be provided electrically to subscriber unit 24 through connector 60 and so that data generated by subscriber unit 24 may be provided electrically to an external device (not shown).

A battery section 64 supplies power to the active components of subscriber unit 24. While FIG. 3 shows a block diagram of subscriber unit 24 which is suitable for the purposes of the present invention, those skilled in the art will appreciate that other features which are conventional in the art of pager design may be included as well. For example, switching devices (not shown) may be incorporated so that power may be selectively switched to various components of subscriber unit 24 in a manner which insures an overall low consumption of power. In addition, a vibrator (not shown) may be provided so that a physical vibration will provide perceptible indications to a user of subscriber unit 24.

Those skilled in the art will appreciate that subscriber unit 24 uses a common antenna 36, controller 46, display 56, keypad 58, and battery 64 for controlling the operation of position-determining receiver 42 and the operation of page receiver 44. As a result of these common components, subscriber unit 24 is a small, inexpensive, and low powered, portable device.

Figure 4:
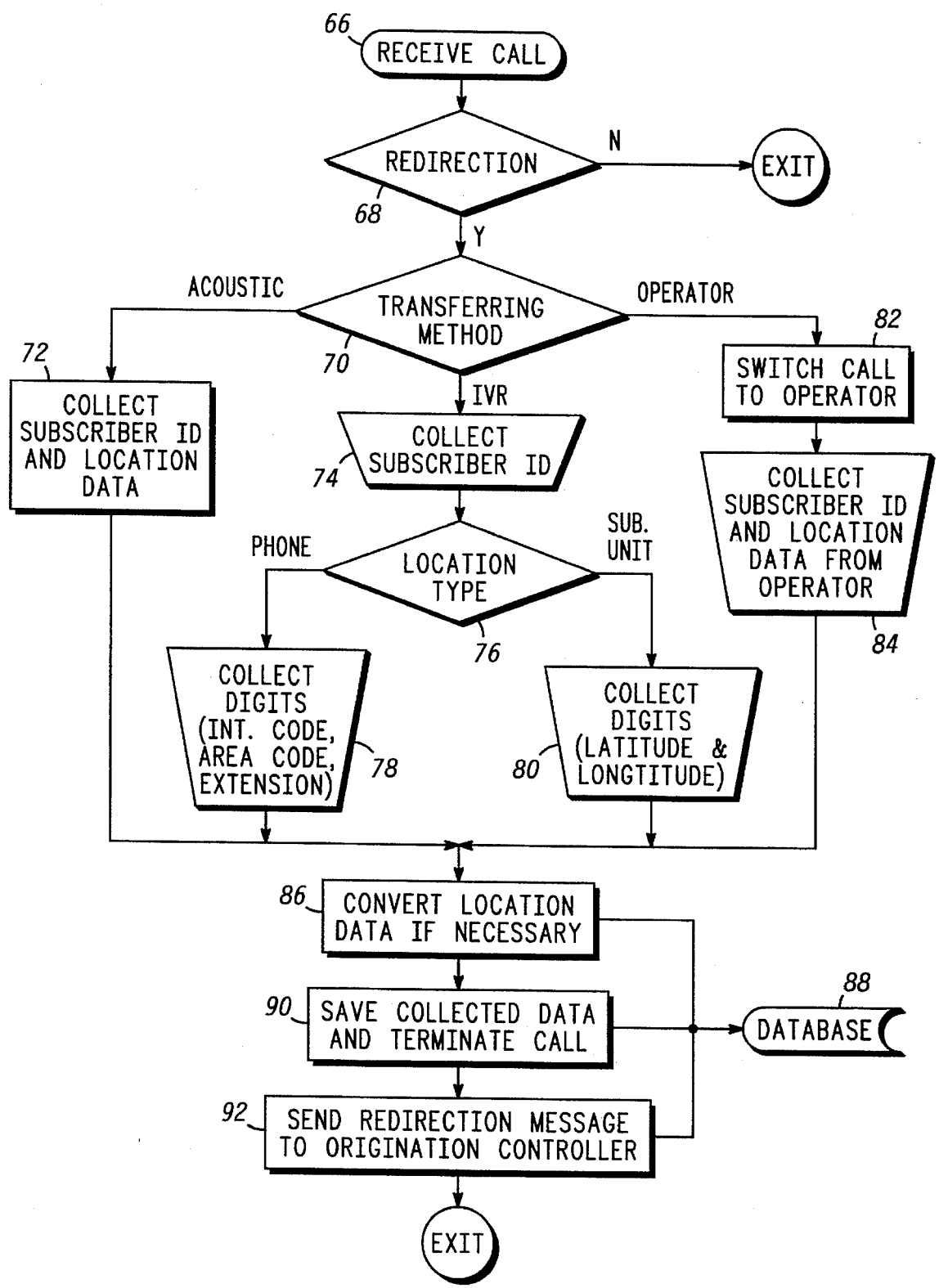
FIG. 4 shows a flow chart of a Receive Call procedure performed by a destination controller of the paging system.

FIG. 4 shows a flow chart of a Receive Call procedure 66 performed by a destination controller 28 of paging system 10 (see FIG. 1). Paging system 10 may incorporate only one destination controller 28 or as many destination controllers 28 as may be desirable for the efficient handling of incoming phone calls. When multiple controllers 28 are used by paging system 10, each of the controllers 28 may perform a procedure similar to Receive Call procedure 66.

As discussed above, destination controller 28 couples to the PSTN 21 and preferably implements a conventional IVR system. Thus, controller 28 plays recorded audio messages over its phone lines and collects responses in the form of DTMF tones from its phone line under the control of Receive Call procedure 66. In accordance with the preferred embodiment of the present invention, each subscriber unit 24 (see FIG. 1) is assigned to a destination controller 28. A user of a subscriber unit 24 may place a telephone call to his or her assigned destination controller 28 when the user roams into a new area of coverage 15 (see FIG. 1) or at any other time. Regardless of the area of coverage 15 into which the user has roamed, the user calls only his or her assigned destination controller at a single phone number. Preferably this single phone number is printed on the user's subscriber unit 24 so that it will be readily available when needed.

Destination controller 28 initiates Receive Call procedure 66 whenever an incoming telephone call is detected and answered at destination controller 28. Procedure 66 performs a query task 68 to determine if the incoming call is for the purpose of receiving a redirection message. A redirection message is a communication which identifies a subscriber and specifies a new location for the subscriber so that future pages may be "redirected" to the new location. Task 68 may determine that the incoming call is a redirection call by collecting data from the caller.

Those skilled in the art will appreciate that the collection of data from a caller in task 68, or in any other task discussed below, may encompass several conventional processes. For example, the caller may be prompted with a message or recording that informs the caller of what information is required. Controller 28 may accept such caller-supplied data in the form of DTMF tones or ASCII data and keep such data in a buffer, even if such data is supplied before the prompt is finished. Controller 28 may desirably wait a predetermined period of time for the caller to supply a response to the prompt. When a response is received from the caller at controller 28, controller 28 may test the response for validity to the extent possible. If the caller fails to supply a response within the predetermined period of time or if an invalid response is detected, the prompt may be repeated to allow the caller another chance to supply valid data. If the caller again fails to supply valid data, the call may be released.

For example, task 68 may play a pre-recorded audio message which informs the caller that destination controller 28 has been reached, then requests the caller to respond by pressing a particular sequence of digits and verifying that the caller pressed the correct digits. In an alternative embodiment (not shown) the user may be requested to enter his or her ID number, and task 28 may check a database to verify the authenticity of the entered number.

If task 68 determines that the call is not a redirection call, program control exits procedure 66. Upon exiting procedure 66, controller 28 may perform tests for other types of calls (not shown), switch the call to an operator for assistance, or the call may be released by controller 28.

If task 68 determines that the call appears to be a valid redirection call, a query task 70 determines which method the caller wishes to use in transferring data to controller 28. At least three different data transferring techniques are contemplated at task 70. In an acoustic technique, the caller controls a subscriber unit 24 to automatically generate audible tones into which subscriber ID and location data have been encoded. In accordance with this acoustic technique, the transference of data is automatic, and controller 28 need not prompt the caller for specific items of data. In an IVR technique, conventional IVR processes are used to prompt the caller to press buttons on a push button phone in a manner which conveys subscriber ID and location data. In an operator-assisted technique, the user may verbally communicate data to a human operator, and the operator may use a keyboard at controller 28 to enter subscriber ID and location data. The determination of task 70 may be made by prompting for and collecting an appropriate response from a user.

Accordingly, when task 70 determines that the acoustic transferring technique has been selected, a task 72 waits to receive tones, preferably DTMF tones, over the phone line and decodes these tones and the data they convey to recover a subscriber ID and location data. When task 70 determines that an IVR transferring technique has been selected, a task 74 collects the subscriber ID from the caller after prompting the caller to push phone buttons corresponding to a subscriber ID. After a subscriber ID has been collected, a query task 76 determines which type of location data the user wishes to supply. This determination may be made by collecting a response from the caller after prompting the caller with an appropriate message.

FIG. 4 shows that task 76 permits the user to supply two types of location data. However, as discussed above, the present invention adopts a broad view of location data and those skilled in the art may adapt paging system 10 (see FIG. 1) to utilize any number of types of location data. One type of location data recognized at task 76 may be generated by the international public phone system. In particular, the caller will be placing a call from a telephone which has a telephone number associated therewith. This telephone number may identify the general location of the caller through the telephone number's international code, area code, and/or extension. If task 76 determines that the caller wishes to communicate phone-system-generated location data, then a task 78 collects dialed digits which represent international code, area code, extension, or the like, after appropriate prompting. If task 76 determines that the caller wishes to communicate subscriber-unit-generated location data, then a task 80 prompts the user for these data. As will be discussed below, such subscriber-unit-generated location data may be in the form of latitude and longitude, for example, or this data may be in the form of transmitter ID, perhaps coupled with time of day information.

When task 70 determines that the caller wishes to use a human operator to transfer subscriber ID and location data, a task 82 switches the call to an operator. After task 82, a task 84 waits for the operator to obtain the subscriber ID and location data from the caller and to enter these data into controller 28.

After any of tasks 72, 78, 80, or 84, controller 28 performs a task 86. Task 86 converts the location data, if necessary, into a more useful form for paging system 10. For example, if phone-system-generated location data is provided, then this form of location data should be converted into a form of location data which is more compatible with paging system 10. Likewise, conversion may be required when the ID of a moving transmitter 12 (see FIG. 1) is provided along with timing data to serve as location data. Such location data may be converted into latitude and longitude data and/or an identity for a particular delivery controller 32 (see FIGS. 1–2) which should be used in broadcasting future pages to the subscriber unit 24 whose ID has just been communicated to controller 28. In addition, location data may be associated with an identity of a geo-political jurisdiction, such as a city near the described location, or a state, province, country, or the like, within which the location resides. Task 86 may convert location data using table look-up operations within a database 88.

After task 86, a task 90 saves the collected location and subscriber ID data, including any conversions of this data, in database 88 and terminates the call. In an alternative embodiment, task 90 may play a message which verbalizes the geo-political jurisdiction associated with the location data to the caller so that the caller may verify the correctness of these data. If the caller determines that these data are incorrect, then the caller may be given another opportunity to enter correct data (not shown).

After task 90, a task 92 sends a redirection message to an origination controller 30 (see FIGS. 1–2). The redirection message identifies the subscriber unit 24 and its reported location. The redirection message may be sent through PSTN 21 (see FIG. 2) using conventional data communication techniques. The redirection message may be sent immediately after task 90, or the message may be queued for delivery to the origination controller 30 at a later time. As discussed above, paging system 10 may include any number of origination controllers 30. The particular origination controller 30 to which the redirection message is sent is the origination controller 30 to which the subscriber unit 24 is assigned. This origination controller's identity may be determined directly through an examination of the subscriber ID obtained above in procedure 66 or indirectly by converting this subscriber ID into a phone number or other address for the appropriate origination controller 30 through database 88.

After task 92, program control exits procedure 66. Procedure 66 will repeat when another call is received. Of course, those skilled in the art will appreciate that destination controller 28 may handle any number of phone lines and simultaneous calls. Procedure 66 may be reentrant to accommodate such simultaneous calls.

Figure 5:
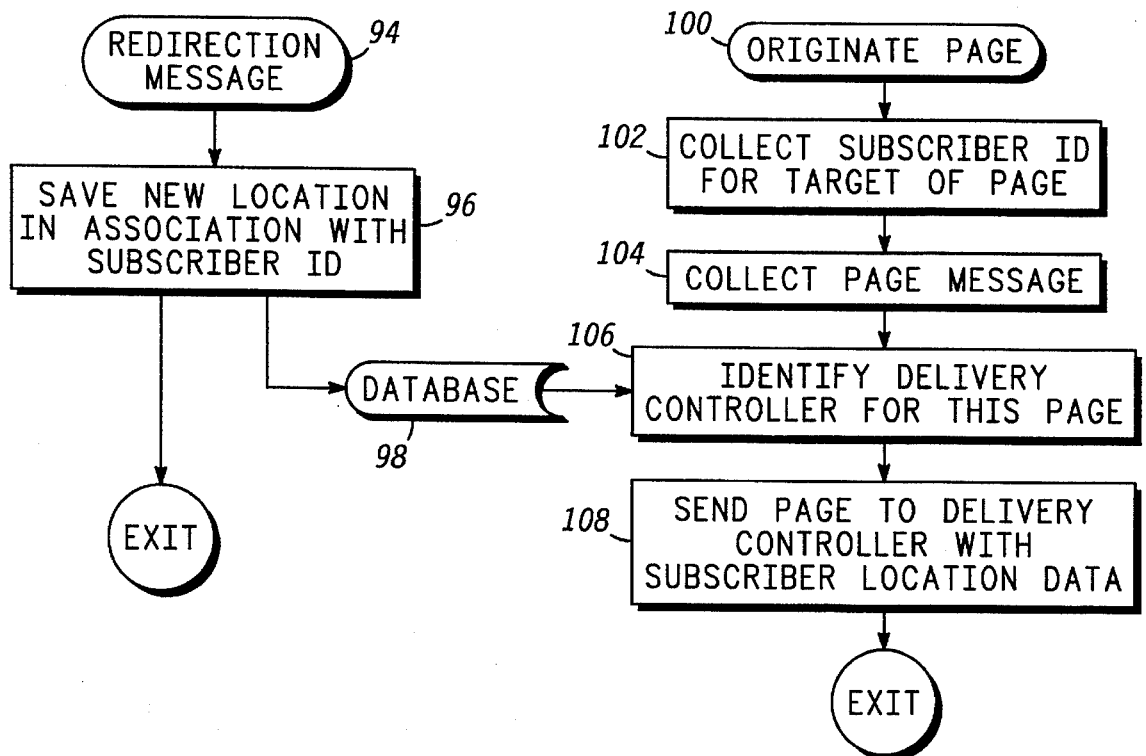
FIG. 5 shows a flow chart of procedures performed by an origination controller of the paging system.

FIG. 5 shows a flow chart of two procedures performed by an origination controller 30. Any number of origination controllers 30 may be included within paging system 10, and each controller 30 may perform these two procedures. Generally speaking, within paging system 10, each subscriber unit 24 is assigned to a single origination controller 30. A party calls or otherwise sends a message to an origination controller 30 in order to place a page to a subscriber unit 24 assigned to that origination controller 30. The origination controller 30 collects the page from the calling party and appropriately routes the page to a delivery controller 32, which will then be responsible for sending the page to its intended target subscriber unit 24.

When a redirection message is received from a destination controller 28, through the performance of task 92 (see FIG. 4), origination controller 30 performs a Redirection Message procedure 94. Procedure 94 performs a task 96 to save the newly reported location data collected by the destination controller 28 in association with the subscriber ID, also collected by the destination controller 28. The subscriber ID should identify a subscriber unit 24 assigned to origination controller 30, and the association between location data and subscriber ID is made within a database 98. After task 96, program control exits procedure 94. Procedure 94 repeats for each redirection message received at origination controller 30.

When an instruction to originate a page is received at origination controller 30, origination controller 30 performs an Originate Page procedure 100. This instruction may, for example, come through PSTN 21 (see FIGS. 1–2). Procedure 100 performs a task 102 to collect a subscriber ID for the target of the page. In other words, task 102 allows a caller to identify the party to whom a page is to be placed. After task 102, a task 104 collects a message to send with the page. As is conventional in the art of paging systems, such a message may describe a telephone number so that the paged party will know who to call in response to the page, and/or any other short message desired by the party originating the page.

After task 104, a task 106 identifies one or more particular delivery controllers 32 (see FIGS. 1–2) to use in delivering the page to the target subscriber unit 24. The selection of delivery controllers 32 depends upon the current location for the target subscriber unit 24. This location may be best determined by retrieving the reported location data stored in database 98 in association with the ID for the target subscriber unit 24.

Those skilled in the art will appreciate that nothing requires task 106 to select only one delivery controller 32 for use in delivering a page. Rather, more than one delivery controller 32 may be selected when a subscriber pays for an upgraded service which consumes increased system resources by broadcasting pages from multiple transmitters 12. The existence of an upgraded service option may be discovered by examining features associated with the subscriber ID in database 98. Moreover, when location data indicate an ambiguity between different areas of coverage 15 (see FIG. 1) handled by different delivery controllers 32, task 106 may select multiple delivery controllers 32 to resolve the ambiguity and to improve the chances of the target subscriber unit 24 successfully receiving the page.

After task 106, a task 108 sends the page to the delivery controller or controllers 32 identified in task 106. The page includes the identity of the target subscriber unit 24 and any message to be communicated by the page. In addition, location data and features data may be sent with the page for use by the delivery controllers 32. As shown in FIG. 2, various ones of transmitters 12 are assigned to particular delivery controllers 32. The delivery controller 32 may use location data and features data to select one or more of its transmitters 12 for broadcasting the page. The page may be sent to the selected delivery controllers 32 via PSTN 21 (see FIGS. 1–2). After task 108, program control exits procedure 100. Procedure 100 repeats for each page that origination controller 30 is instructed to originate.

Figure 6:
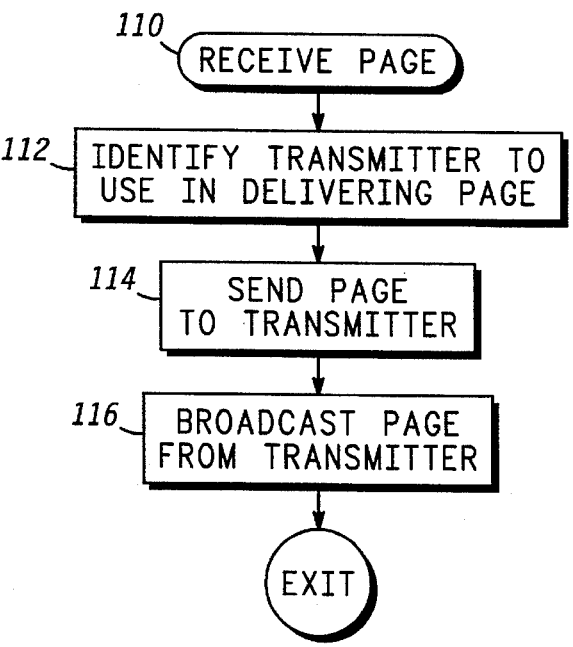
FIG. 6 shows a flow chart of a Receive Page procedure performed by a delivery controller of the paging system.

FIG. 6 shows a flow chart of a Receive Page procedure 110 performed by a delivery controller 32 (see FIGS. 1–2). Any number of delivery controllers 32 may be included within paging system 10, and each controller 32 may perform procedure 110. Generally speaking, within paging system 10, each transmitter 12 (see FIG. 1) is assigned to a delivery controller 32. Thus, the areas of coverage 15 (see FIG. 1) associated with these transmitters 12 are likewise associated with a single delivery controller 32. In the preferred embodiment where transmitters 12 move relative to the earth, the transmitter 12 assignments are temporary, but the areas of coverage 15 associated with a particular delivery controller 32 do not substantially change as a function of time.

When a page is received at a delivery controller 32 from an origination controller 30, through the performance of task 108 (see FIG. 5), destination controller 32 performs Receive Page procedure 110. Procedure 110 includes a task 112 which uses any location data accompanying the page to identify particular transmitters 12 (see FIG. 2) to use in delivering the page. As was discussed above in connection with task 106 (see FIG. 5), controller 32 may select one or more transmitters 12 to resolve ambiguities or to comply with upgraded service features.

After task 112, a task 114 sends the page to the selected transmitters 12. In the preferred embodiment, the page may be sent via communication links 18 (see FIGS. 1–2). In alternate embodiments where transmitters are located on the ground, PSTN 21 may be used to transfer the pages to transmitters 12. As illustrated in a task 116, the selected transmitters 12 will respond by broadcasting the page using the RF spectrum assigned to the transmitters 12 by paging system 10. After task 116, program control exits procedure 110. Procedure 110 repeats for each page received from origination controllers 30.

Those skilled in the art will appreciate that nothing prevents copies of destination controller 28, origination controller 30, and delivery controller 32 from being implemented within a single set of computer hardware. When a single set of hardware embodies one or more of controllers 28, 30, or 32, the above-discussed procedures need not utilize PSTN 21 in sending messages between co-located controllers. Those skilled in the art may adapt the above-discussed procedures to place messages sent from one controller to a co-located controller in an appropriate buffer so that the target co-located controller will then recognize the message as an incoming message. Likewise, those skilled in the art will appreciate that delivery controllers 32 need not be co-located with CSOs 16 as shown in FIG. 2. Rather, delivery controllers 32 may be located separately and use PSTN 21 to deliver pages to CSOs 16 for subsequent transmission to transmitters 12 via communication links 18.

Subscriber units 24 are configured for compatibility with paging system 10. For example, subscriber units 24 receive pages broadcast by transmitters 12. When a subscriber unit 24 identifies a page as being directed specifically to it, the subscriber unit 24 provides a perceptible indication of the receipt of the page. The perceptible indication may take the form of an audible sound, a vibration, a visual display, or a combination of these, as is conventional in the art of paging.

Figure 7:
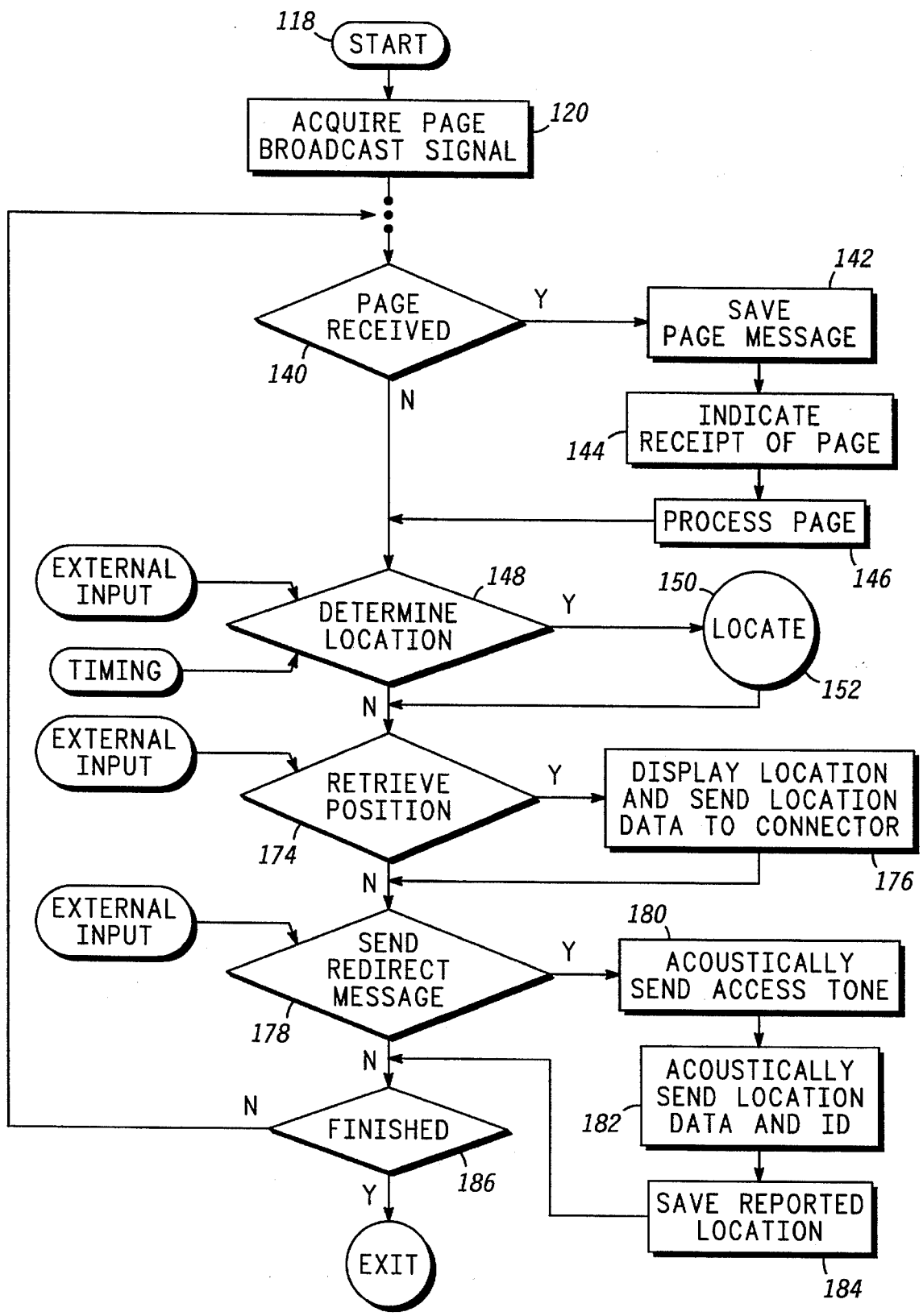
FIG. 7 shows a Start procedure performed by a subscriber unit.

In addition, subscriber units 24 may provide the location data which are transferred to destination controllers 28, as discussed above in connection with FIG. 4. FIG. 7 shows a flow chart of a Start procedure 118 that a subscriber unit 24 performs in processing received pages and in generating location data. As discussed above, paging system 10 may include any number of subscriber units 24. Any number of these subscriber units 24 may perform procedure 118. Procedure 118 is performed whenever a subscriber unit 24 awakes from a low power, standby mode of operation. Procedure 118 first performs a task 120 to acquire a page broadcast signal transmitted by a transmitter 12 (see FIGS. 1–2). This signal is received through page receiver 44 (see FIG. 3). This acquisition task may involve iterative processes to enable the receipt of appropriate frequencies and to synchronize the operation of subscriber unit 24 with data being broadcast by a nearby transmitter 12.

Figure 8:
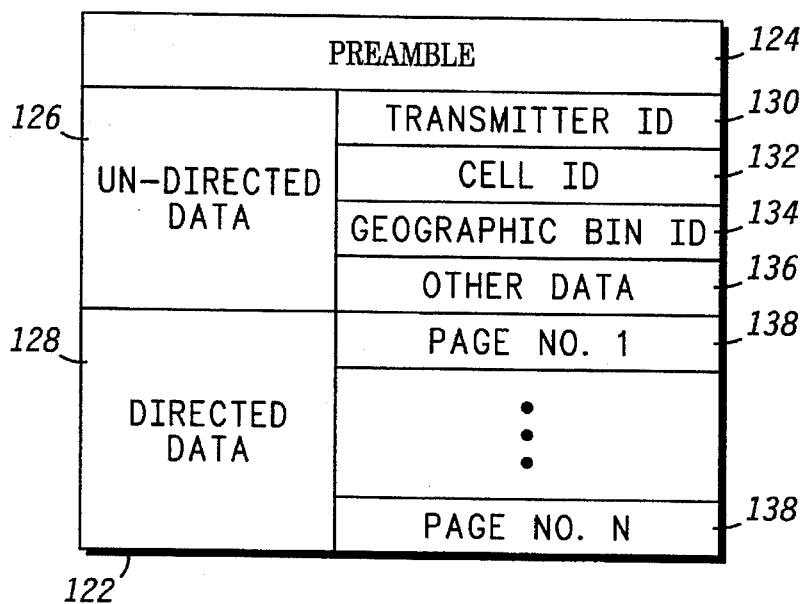
FIG. 8 presents an exemplary format diagram of data broadcast from transmitters of the paging system.
Figure 10:
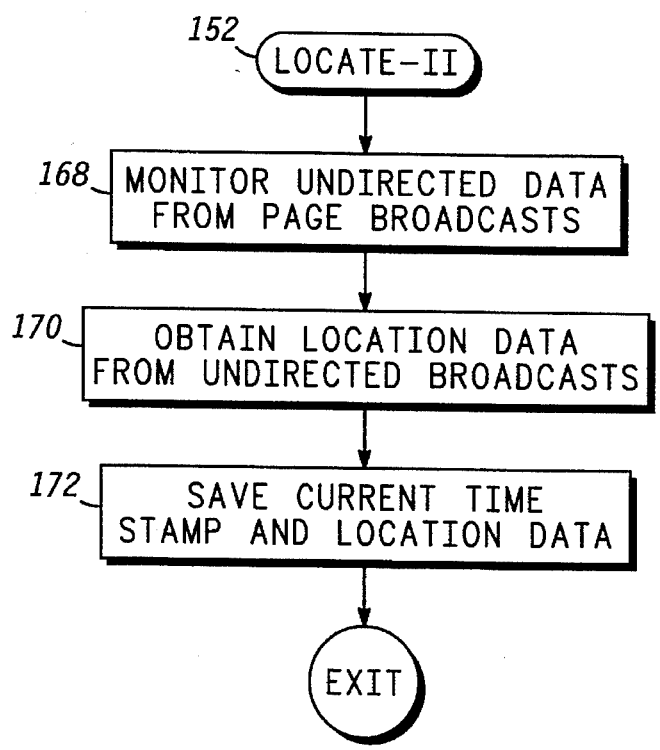
FIG. 10 shows a second embodiment of a Locate procedure performed by the subscriber unit.

FIG. 8 presents an exemplary format diagram of data broadcast from transmitters 12 of paging system 10. As shown in FIG. 10, transmitters 12 may, for example, broadcast a frame 122 of data. After one frame 122 has been broadcast, a transmitter 12 will broadcast other frames 122 having an identical or similar format. Frame 122 includes a preamble 124 which subscriber units 24 use to achieve synchronization. After preamble 124, frame 122 includes undirected data 126, followed by directed data 128. Undirected data 126 are intended for all devices which are capable of receiving frame 122 rather than for any single particular recipient. Undirected data 126 include location data. These location data may take the form of a transmitter ID 130 and a cell ID 132, when a transmitter 12 broadcasts in a plurality of diverse cells. These location data may additionally or alternatively include geographic bin ID data 134 which directly identify a geographical area on the earth or which identify a latitude and longitude of a center of an area of coverage 15 (see FIG. 1). Of course, those skilled in the art will appreciate that undirected data 126 may include any other data 136, such as timing data for example, which may be useful for the efficient operation of paging system 10. Directed data 128 include any number of pages 138. Each page 138 includes a subscriber ID that a particular subscriber unit 24 can recognize, and each page 138 often includes data which serve as a page message.

With reference back to FIG. 7, after task 120, subscriber unit 24 may perform any number of processes (not shown) which are conventional in the art of paging systems. For example, such processes may adjust timing variables to manage sleep and wake periods for the low power operation of subscriber unit 24. In addition, such processes may monitor directed data 128 (see FIG. 8) to determine whether a page broadcast by a transmitter 12 is addressed to subscriber unit 24.

Eventually, procedure 118 performs a query task 140. Task 140 determines whether a page addressed to subscriber unit 24 has been received by subscriber unit 24. When task 140 discovers that a page has been received, a task 142 saves any message associated with the page in memory 48 (see FIG. 3). After task 142, a task 144 causes subscriber unit 24 to make a perceptible indication of the receipt of the page. Such indications may be made through audible beeps acoustically broadcast from loudspeaker 52, for example. After task 144, a task 146 processes the page in a conventional manner. For example, the beep sound may be repeated at predetermined intervals until a user indicates acknowledgment through the manipulation of a predefined key on keypad 58 (see FIG. 3). A page message may be displayed at display 56 (see FIG. 3). And, the page message may be saved in memory 48 until recalled by a user.

After task 146 or when task 140 determines that no page has been received, subscriber unit 24 performs a query task 148. Task 148 decides whether to engage in activities that will lead to the determination of a current location for subscriber unit 24. Task 148 may base its decision on the receipt of an external input, such as the manipulation of a predetermined key from keypad 58 (see FIG. 3) or on the receipt of a command from connector 60 (see FIG. 3).

A user of subscriber unit 24 may wish to instruct subscriber unit 24 to determine location when a call is being or is about to be made to a destination controller 28, as discussed above in connection with FIG. 4. By instructing subscriber unit 24 to determine its own location, a user will have location data to transfer to the destination controller 28 in accordance with the IVR system discussed above in connection with FIG. 4. However, those skilled in the art will appreciate that a user need not wait until placing a call to destination controller 28 before instructing subscriber unit 24 to determine its current location. A user may cause subscriber unit 24 to determine its current location for any reason whatsoever.

Task 148 may also base its decision to determine a current location on timing. In other words, subscriber unit 24 may perform location determination activities in accordance with a programmed schedule regardless of external inputs, and task 148 may determine that the current time meets schedule requirements for determining location.

Figure 9:
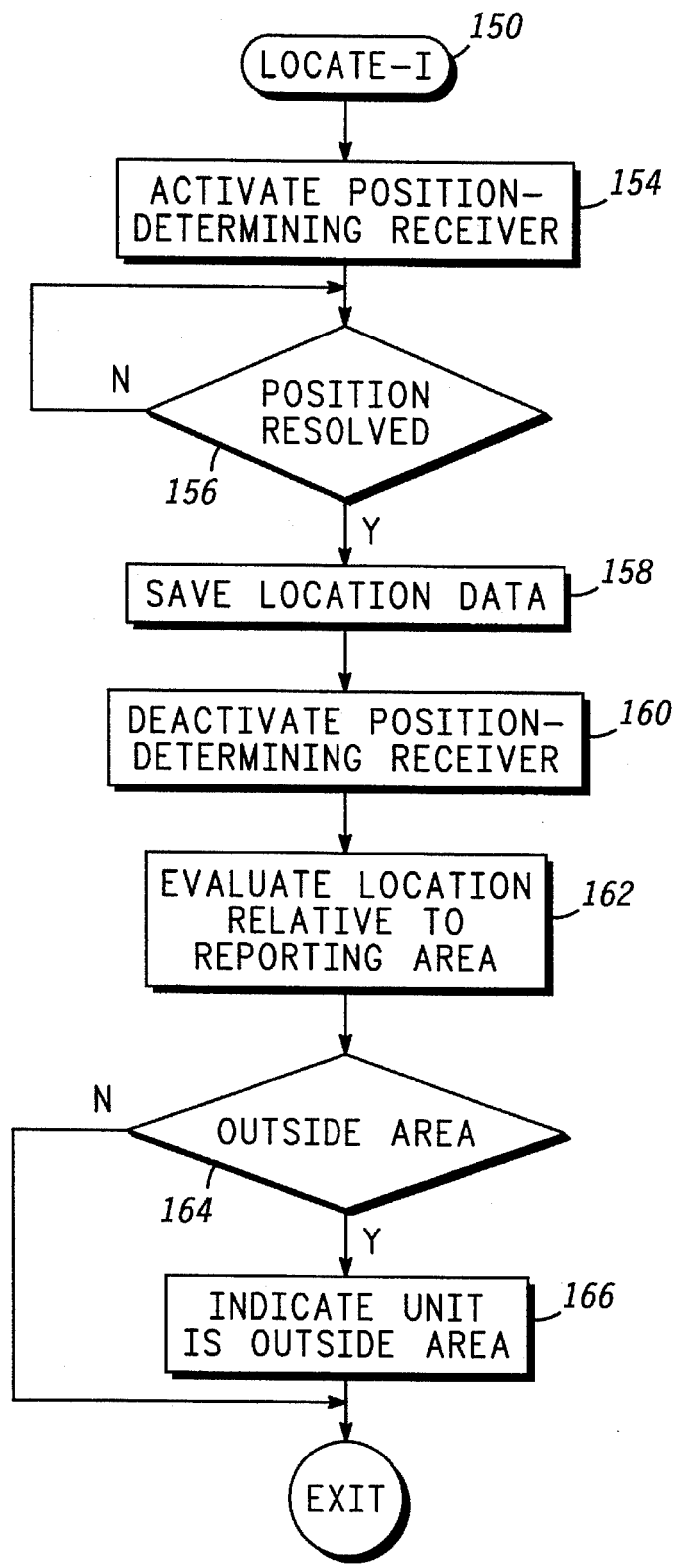
FIG. 9 shows a first embodiment of a Locate procedure performed by the subscriber unit.

When task 148 decides to undertake location determination activities, subscriber unit 24 performs a location procedure. FIG. 9 shows a flow chart for a Locate-I procedure 150, which is performed to implement a first embodiment of subscriber unit 24, and FIG. 10 shows a flow chart for a Locate-II procedure 152, which is performed to implement a second embodiment of subscriber unit 24.

The first embodiment depicted in FIG. 9 uses position-determining receiver 42 (see FIG. 3) to determine a current location for subscriber unit 24. Preferably, by using receiver 42 subscriber unit 24 obtains location data in the form of a latitude and longitude. In accordance with this first embodiment, procedure 150 performs a task 154 to activate position-determining receiver 42. After task 154, program control waits at a query task 156 until a position has been resolved. In other words, program control proceeds to a task 158 when valid position information has been obtained from position-determining receiver 42. Task 158 saves the location data provided by position-determining receiver 42. The location data are saved so that they will be conveniently available for the user's use when needed in transferring location data to destination controller 28, as discussed above in connection with FIG. 4. After task 158, a task 160 deactivates receiver 42 to reduce power consumption.

After task 160, procedure 150 performs a task 162 to evaluate the newly determined location relative to a predetermined reporting area. The specific reporting area with which the new location is evaluated is not an important parameter in the present invention. For example, a reporting area may represent a circle having a predetermined radius and being centered at the last reported location for subscriber unit 24. In alternate embodiments, more complicated reporting areas may be programmed in subscriber unit 24. After the evaluation of task 162, a query task 164 determines whether the newly determined location is outside the reporting area. If the newly determined location is outside the reporting area, a task 166 provides a perceptible indication of that fact. Although not shown in FIG. 9, subscriber unit 24 may handle this "outside reporting area" message in a manner similar to a page receipt, as discussed above in connection with task 146 (see FIG. 7). After task 166 or when task 164 determines that the newly determined location is not outside the reporting area, program control exits procedure 150. Fresh location data have been obtained and stored within memory 48 (see FIG. 3).

In the alternative embodiment for obtaining location data presented in connection with FIG. 10, position-determining receiver 42 (see FIG. 3) may be omitted from subscriber unit 24. In Locate-II procedure 152, shown in FIG. 10, subscriber unit 24 obtains location information directly from the undirected data 126 (see FIG. 8) broadcast from a transmitter 12.

Procedure 152 performs a task 168 to monitor the undirected data 126 in page broadcasts received through page receiver 44 (see FIG. 3). A task 170 obtains a preferred form of location data, such as transmitter ID 130, cell ID 132, and/or geographic bin ID 134 (see FIG. 8), from undirected data 126. After task 170, a task 172 saves a current time stamp and the location data obtained above in task 170. These data items are saved in memory 48 (see FIG. 3). The saving of a time stamp is an optional feature of task 172 which may be omitted when transmitters 12 do not move relative to the earth. As discussed above, these data items serve as location data for paging system 10 because they correlate with geographic areas of the earth. After task 172, program control exits procedure 152. Location data have been obtained and stored within memory 48.

With reference back to FIG. 7, after the location data have been obtained and stored through the performance of either procedure 150 (see FIG. 9) or procedure 152 (see FIG. 10), program control proceeds to a query task 174. In addition, when task 148 decides not to engage in location determination activities program control proceeds to task 174.

Task 174 determines whether to retrieve location data stored within memory 48 (see FIG. 3). Task 174 may, for example, decide to retrieve location data in response to an external input, such as a user manipulation of a key from keypad 58 (see FIG. 3) or an external command received through connector 60. When task 174 decides to retrieve location data, a task 176 displays the location data at display 56 (see FIG. 3) and sends the location data to connector 60 for use by an external device which may be coupled thereto. As discussed above, this location data may take different forms, including a latitude and longitude form, a transmitter ID form, or a transmitter ID coupled with timing data form. When timing data are included as a part of the location data, an absolute time stamp saved above in connection with task 172 (see FIG. 10) may be converted into relative time. Thus, the time data may now indicate the duration transpiring since the other location data were obtained rather than the absolute point in time when the other location data were obtained. That way, an internal clock maintained within subscriber unit 24 need not be exactly synchronized with system time.

A user may request retrieval of location data when making the telephone call to a destination controller 28, as discussed above in connection with FIG. 4. In particular, such data may be useful in responding to prompts in connection with the performance of task 80 in the IVR system discussed above in connection with FIG. 4. A user may then press telephone keys which correspond to numbers displayed at display 56 (see FIG. 3) while controller 28 performs its task 80 (see FIG. 4).

After task 176 or when task 174 determines not to retrieve location data, a query task 178 determines whether to send a redirect message. Task 178 may decide to send a redirect message in response to an external input, such as the manipulation of a key from keypad 58 (see FIG. 3). When task 178 determines that subscriber unit 24 needs to send a redirect message, a task 180 acoustically sends an access tone. The access tone is broadcast from loudspeaker 52. This access tone is configured in cooperation with task 70 (see FIG. 4) of destination controller 28 (see FIGS. 1–2) so that the controller 28 will accept an upcoming acoustic transferal of data. Accordingly, the external input discussed above in connection with task 178 is preferably supplied when a telephone call has been placed to a destination controller 28, and controller 28 has progressed to task 70 in the IVR procedure discussed above in connection with FIG. 4. The user may simply place loudspeaker 52 (see FIG. 3) of subscriber unit 24 near a microphone of a telephone instrument 22 (see FIGS. 1–2) and the audio tone is acoustically transferred from subscriber unit 24 through the telephone instrument 22. From telephone instrument 22 the audio tone is electrically transferred through PSTN 21 to the destination controller 28.

After task 180, a task 182 acoustically broadcasts location data and subscriber ID. As discussed above in connection with task 176, these location data may take any one of numerous diverse forms. Task 182 allows a destination controller 28 to collect data during its task 72, discussed above in connection with FIG. 4. After task 182, a task 184 saves the reported location in memory 48 (see FIG. 3) for possible use in connection with task 162 (see FIG. 9).

After task 184 or when task 178 determines not to send a redirect message, a query task 186 determines whether to exit a programming loop that controls the operation of subscriber unit 24. By exiting the loop, subscriber unit 24 may operate for a time in a standby or sleep mode which consumes less power. When task 186 determines that subscriber unit 24 has not yet finished looping, program control returns to task 140. When task 186 determines that subscriber unit 24 has finished, program control exits procedure 118. However, subscriber unit 24 may continuously repeat procedure 118 at predetermined intervals.

In summary, the present invention provides an improved wide-area paging system. In the preferred embodiment, the system's total coverage area may encompass the entire earth. The wide-area paging system of the present invention efficiently uses the RF spectrum and has a great capacity for delivering pages. The efficiency and corresponding large capacity result from broadcasting pages from only a minimal number of transmitters and refraining from broadcasting pages from transmitters which cover areas where target subscriber units are not located. Roaming users place telephone calls to the paging system to report the users' current locations. Roaming users place calls to only a single phone number regardless of the coverage area into which the users travel. During these calls, the users provide location information to the paging system. The location information may be obtained by the same subscriber unit that receives pages.

The present invention has been described above with reference to preferred embodiments. However, those skilled in the art will recognize that changes and modifications may be made in these preferred embodiments without departing from the scope of the present invention. For example, others may devise alternate procedures to accomplish substantially the same functions as those described herein. In addition, those skilled in the art will be able to adapt the teaching of the present invention to obtain and use forms of location data not specifically disclosed herein. These and other changes and modifications which are obvious to those skilled in the art are intended to be included within the scope of the present invention.

What is claimed is:

1. In a paging system wherein subscriber units respond to coded radio transmissions by providing perceptible indications of page receipts, said paging system including a plurality of satellite nodes that move with respect to the surface of earth, each of said satellite nodes providing a plurality of antenna beams that serve a plurality of geographic areas and each of said antenna beams having a broadcast channel associated therewith, and wherein said subscriber units include a loudspeaker and are able to roam between said geographic areas, a wide-area paging method comprising the steps of:

receiving at a subscriber unit, a beam identifier within one of said broadcast channels of one of said antenna beams, said beam identifier uniquely identifying said one antenna beam from said plurality of antenna beams;

saving said beam identifier and a receipt time of said beam identifier within said subscriber unit, said beam identifier and said receipt time forming current location data and defining a current location of said subscriber unit;

placing a telephone call from a user of said subscriber unit to a destination controller of said paging system using a telephone instrument; and transferring said current location data to said destination controller during said telephone call by acoustically transmitting said current location data from said loudspeaker to said telephone instrument, wherein said paging system performs the steps of:

determining, by said destination controller, a geographic location of said subscriber unit based on said transferred current location data and system configuration data of said paging system, said system configuration data of said paging system being stored in a database at the destination controller;

identifying one of said satellite nodes which has an antenna beam presently serving said current location when a data message intended for said subscriber unit is received at said destination controller;

sending said data message intended for said subscriber unit to said identified satellite node; and broadcasting said data message within said antenna beam presently serving said current location.

2. A wide-area paging method as claimed in claim 1 wherein the identifying step is performed by said destination controller in response to the receipt of said data message.

3. A wide-area paging method as claimed in claim 1 wherein the receiving said beam identifier step and the saving step are performed in response to an input from an external input means at said subscriber unit.

4. A roaming subscriber unit for use in connection with a paging system wherein a plurality of similar subscriber units are responsive to coded radio transmissions, wherein said paging system includes a plurality of satellite nodes that move with respect to the surface of earth and that provide a plurality of antenna beams serving a plurality of geographic areas, and wherein said subscriber units are able to roam between said areas, said subscriber unit comprising:

a location receiver configured to receive a beam identifier from a broadcast channel associated with one of said antenna beams, said beam identifier uniquely identifying said one antenna beam from other antenna beams of said plurality of antenna beams;

a memory for storing said beam identifier and a receipt time, said receipt time being a time of receipt of said beam identifier, said beam identifier and said receipt time forming current location data and defining a current location of said subscriber unit;

a loudspeaker for audibly broadcasting a data message intended for said subscriber unit;

a user input means coupled to a controller;

said controller configured to obtain said current location data in response to an input from said user input means;

a broadcaster for transferring said current location data over a telephone line during a telephone call to a destination controller; and a page receiver for receiving said coded radio transmissions intended for said subscriber unit, wherein said broadcaster is configured to broadcast said current location data from said loudspeaker in response to an input from said user input means, wherein said destination controller comprises a database for storing system configuration data of said paging system, said destination controller determining a geographic location of said subscriber unit based on said transferred current location data and said stored system configuration data of said paging system, and wherein when said destination controller receives said data message intended for said subscriber unit, said destination controller identifies one of said satellite nodes which has an antenna beam presently serving said current location, sends said data message to said identified satellite node, and broadcasts said data message within said antenna beam presently serving said current location.

5. A roaming subscriber unit as claimed in claim 4 further comprising means for providing perceptible indications of said data message, and means for providing perceptible indications of said current location data.

6. In a paging system wherein subscriber units respond to radio transmissions, wherein said radio transmissions are broadcast from one of a plurality of satellite nodes that move with respect to the surface of the earth, each of said satellite nodes having cells that serve a plurality of geographic areas, and wherein said subscriber units are able to roam between said areas, a roaming subscriber unit operating method comprising the steps of:

receiving, at said subscriber unit, a cell identifier (ID) from a cell in which said subscriber unit is currently located, and determining at said subscriber unit a time of receipt of said cell ID, said cell ID and said time of receipt forming current location data;

providing, at said subscriber unit upon receipt of an external input, a perceptible indication of said current location data; and transferring said cell ID and said time of receipt of said cell ID from said subscriber unit to a destination controller of said paging system, said transferring step directing said destination controller to route data messages intended for said subscriber unit to a current location of said subscriber unit defined by said cell ID and said time of receipt, wherein the transferring step comprises audibly broadcasting said cell ID and said time of receipt over a telephone line to said destination controller upon receipt of an external input at said subscriber unit, wherein said paging system performs the steps of:

determining, by said destination controller, a geographic location of said subscriber unit based on said cell ID, said time of receipt, and system configuration data of said paging system, said system configuration data being stored in a database at said destination controller;

identifying one of said satellite nodes which has an antenna beam presently serving said current location in response to receipt of a data message intended for said subscriber unit;

sending said data message intended for said subscriber unit to said identified satellite node; and broadcasting said data message within said antenna beam presently serving said current location.

7. A roaming subscriber unit operating method as claimed in claim 6 additionally comprising the step of saving said cell ID and said time of receipt in a memory.

* * * * *